: 5,892,952

United States Patent [19]
Seko et al.

[11] Patent Number: 5,892,952
[45] Date of Patent: *Apr. 6, 1999

[54] OPERATING SYSTEM RENEWING APPARATUS AND METHOD FOR INSTALLING NEW OPERATING SYSTEM IN COMPUTER SYSTEM

[75] Inventors: Shigeru Seko, Kawasaki; Yoshiki Nakamura, Unoke-machi, both of Japan

[73] Assignees: Fujitsu Limited, Kawasaki; PFU Limited, Kahoku-gun, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 755,649

[22] Filed: Nov. 25, 1996

Related U.S. Application Data

[63] Continuation of Ser. No. 278,817, Jul. 22, 1994, abandoned.

[30]    Foreign Application Priority Data

Sep. 30, 1993    [JP]    Japan ................................. 5-245360

[51] Int. Cl.$^6$ ..................................................... G06F 9/445
[52] U.S. Cl. ........................................................... 395/712
[58] Field of Search ............................. 395/712, 651–653

[56]    References Cited

U.S. PATENT DOCUMENTS 5,140,680    8/1992    Ottman et al. .......................... 395/712
5,452,454    9/1995    Basu ....................................... 395/700

FOREIGN PATENT DOCUMENTS 0284924    10/1988    European Pat. Off. .
2264575    9/1993    United Kingdom .

*Primary Examiner*—Emanuel Todd Voeltz
*Assistant Examiner*—John Q. Chavis
*Attorney, Agent, or Firm*—Armstrong,Westerman, Hattori, McLeland and Naughton

[57]    ABSTRACT

A new system supplying unit comprises a saving area for saving therein common information and a new system storing area for storing the new operating system. A new system installing system comprises an installing process storing unit for storing a procedure for installing the new operating system into the system storing unit, a boot controlling unit for reading the procedure from the installing process storing unit and a executing unit for executing the procedure. The procedure comprises a plurality of steps. The boot controlling unit reads a first step of the plurality of steps, the boot controlling unit supplies the read step to the executing unit, and the executing unit causes the boot controlling unit to read a second step of the plurality of steps after executing the first step. The procedure saves, in the saving area, the common information before the new system is installed in the system storing unit and transfers the common information from the saving area to the system storing unit. The procedure reports, to a higher-rank system, a condition of the system installation executed by the new system installing unit. The common information is included in an existing operating system and comprises suitable information previously provided so that the existing operating system is made suitable for a particular use. The suitable information comprises office automation data, customized parameters and network definition data required to connect the existing operation system to a network.

2 Claims, 10 Drawing Sheets

```
┌─────────── [ INSTALLATION CONTROLLING SENTENCES ] ───────────
│ #  INSTALLATION CONTROLLING SENTENCES : SYSUP __ INSTALL
│ #  SAVE RELEVANT DATA / INSTALL SYSTEM / DATA SET
│ #  FINALLY, DELETE IPL CONTROLLING SENTENCES
│
│ ###  USER DATA SAVING
│ #  REPORTING TO HOST / LOGGING OF USER DATA SAVING
│     STARTING
│ SEND/LOG  'USER DATA SAVING PROCESS IS STARTING'
│
│ ###  USER DATA SAVING  ###
│ IF   'SAVUSYS FROM—HDO TO—MOO' = = OK
│ THEN
│        #  USER DATA SAVING PROPER COMPLETION REPORTING
│           TO HOST / LOGGING
│        SEND/LOG  'USER DATA SAVING HAS BEEN PROPERLY
│                  COMPLETED'
│ ELSE
│        #  USER DATA SAVING IMPROPER TERMINATION
│           REPORTING TO HOST / LOGGING
│        SEND/LOG  'ACCIDENT HAS OCCURRED IN USER DATA SAVING
│                  PROCESS'
│ FI
│ #  REPORTING TO HOST / LOGGING OF CUSTOMIZED DATA
│     SAVING STARTING
│ SEND/LOG  'SAVING OF CUSTOMIZED DATA IS STARTING'
│
│ ###  CUSTOMIZED DATA SAVING  ###
│ IF   'SAVCUSTMZ FROM—HDO TO—MOO' = = OK
│ THEN
│        #  CUSTOMIZED DATA SAVING PROPER COMPLETION
│           REPORTING TO HOST / LOGGING
│        SEND/LOG  'CUSTOMIZED DATA SAVING HAS BEEN PROPERLY
│                  COMPLETED'
│ ELSE
│        #  CUSTOMIZED DATA SAVING IMPROPER TERMINATION
│           REPORTING TO HOST / LOGGING
│        SEND/LOG  'ACCIDENT HAS OCCURRED IN CUSTOMIZED DATA
│                  SAVING PROCESS'
│ FI
```

| 30 | 31 | 32 | 33 | 34 |

30 — (symbol)
31 — INDEPENDENT UTILITY AREA
32 — AUTOMATING DEFINITION AREA
33 — NEW SYSTEM AREA
34 — SAVING AREA

```
---[ GROUP DEFINITION ]---

AUTOMATING DEFINITION FOR VERSION-UP : SYSUP

AUTOMATING DEFINITION FOR SYSTEM-REPLACEMENT : SYSCHG

. . . . . . . . . . . . . . .
```

```
---[ GROUP DEFINITION STARTING PROCEDURE ]---

#   SYSUP PROCEDURE
#   NETWORK DEFINITION SAVING CONTROLLING
    SENTENCES STARTING
SYSUP_SAVNET
```

FIG.6

─ [ NETWORK DEFINITION SAVING CONTROLLING SENTENCES ] ─

```
#   NETWORK DEFINITION SAVING
    CONTROLLING SENTENCES     : SYSUP _ SAVNET
#   SAVE NETWORK DEFINITIONS, PRODUCE IPL CONTROLLING
    SENTENCES.

NETWORK DEFINITION SAVING
IF   'SAVNET FROM-HDO TO-MOO' == 0

THEN
      #   NETWORK DEFINITION SAVING PROPER COMPLETION
          LOGGING
      LOG 'NETWORK DEFINITION SAVING HAS BEEN PROPERLY
           COMPLETED'

ELSE
      #   NETWORK DEFINITION SAVING IMPROPER TERMINATION
          LOGGING
      LOG 'ACCIDENT HAS OCCURRED IN NETWORK DEFINITION
           SAVING PROCESS'
FI

IPL CONTROLLING SENTENCE PRODUCTION
COPY MOO-SYSUP_IPL HDO-SYSUP_IPL

RE-IPL ⇨ INDEPENDENT UTILITY RE-STARTING
      ( IPL DEFINITION SENTENCE EXECUTION )
REIPL
```

FIG.7

```
┌──────[ IPL DEFINITIONS ]──────────────────────────────┐
│                                                        │
│  #  NETWORK DEFINITION ACTIVATING CONTROLLING          │
│       SENTENCE STARTING                 : SYSUP_IPL    │
│  EXEC 'SYSUP_ACTNET'                                   │
│                                                        │
│  #  INSTALLATION CONTROLLING SENTENCE STARTING         │
│  EXEC 'SYSUP_INSTALL'                                  │
│                                                        │
└────────────────────────────────────────────────────────┘
```

FIG.8

```
┌─[ NETWORK DEFINITION ACTIVATING CONTROLLING SENTENCES ]─┐
│                                                          │
│  #  NETWORK DEFINITION ACTIVATING                        │
│       CONTROLLING SENTENCES      : SYSUP _ SAVNET        │
│  #  ACTIVATE SAVED NETWORK DEFINITIONS ON INDEPENDENT    │
│     UTILITY                                              │
│                                                          │
│  # # #   NETWORK DEFINITION ACTIVATION                   │
│  IF    'ACTNET NETVOL−MOO' = = 0                         │
│                                                          │
│  THEN                                                    │
│       #  NETWORK DEFINITION ACTIVATING PROPER COMPLETION │
│          REPORTING TO HOST / LOGGING                     │
│     SEND/LOG 'NETWORK DEFINITION ACTIVATING PROCESS      │
│               HAS BEEN PROPERLY COMPLETED'               │
│                                                          │
│  ELSE                                                    │
│       #  NETWORK DEFINITION ACTIVATING IMPROPER          │
│          TERMINATION LOGGING                             │
│     LOG 'ACCIDENT HAS OCCURRED IN NETWORK DEFINITION     │
│          ACTIVATING PROCESS'                             │
│                                                          │
│  FI                                                      │
│                                                          │
└──────────────────────────────────────────────────────────┘
```

FIG.9

```
┌──────── [ INSTALLATION CONTROLLING SENTENCES ] ────────┐

#   INSTALLATION CONTROLLING SENTENCES : SYSUP __ INSTALL
#   SAVE RELEVANT DATA / INSTALL SYSTEM / DATA SET
#   FINALLY, DELETE IPL CONTROLLING SENTENCES

USER DATA SAVING
#   REPORTING TO HOST / LOGGING OF USER DATA SAVING
    STARTING
SEND/LOG  'USER DATA SAVING PROCESS IS STARTING'

USER DATA SAVING   ###
IF   'SAVUSYS FROM—HDO TO—MOO' = = OK
THEN
        #   USER DATA SAVING PROPER COMPLETION REPORTING
            TO HOST / LOGGING
        SEND/LOG  'USER DATA SAVING HAS BEEN PROPERLY
                    COMPLETED'
ELSE
        #   USER DATA SAVING IMPROPER TERMINATION
            REPORTING TO HOST / LOGGING

SEND/LOG  'ACCIDENT HAS OCCURRED IN USER DATA SAVING
                    PROCESS'
FI

#   REPORTING TO HOST / LOGGING OF CUSTOMIZED DATA
    SAVING STARTING
SEND/LOG  'SAVING OF CUSTOMIZED DATA IS STARTING'

CUSTOMIZED DATA SAVING   ###
IF   'SAVCUSTMZ FROM—HDO TO—MOO' = = OK
THEN
        #   CUSTOMIZED DATA SAVING PROPER COMPLETION
            REPORTING TO HOST / LOGGING
        SEND/LOG  'CUSTOMIZED DATA SAVING HAS BEEN PROPERLY
                    COMPLETED'
ELSE
        #   CUSTOMIZED DATA SAVING IMPROPER TERMINATION
            REPORTING TO HOST / LOGGING

SEND/LOG  'ACCIDENT HAS OCCURRED IN CUSTOMIZED DATA
                    SAVING PROCESS'
FI
```

FIG.10

```
#   REPORTING TO HOST / LOGGING OF NEW SYSTEM
    INSTALLATION STARTING
SEND/LOG   'NEW SYSTEM INSTALLATION IS STARTING'

NEW SYSTEM INSTALLATION
IF    'RESSYS FROM-MOO TO-HDO' = = OK
THEN
     #   NEW SYSTEM INSTALLATION PROPER COMPLETION
         REPORTING TO HOST / LOGGING
     SEND/LOG   'NEW SYSTEM INSTALLATION HAS BEEN PROPERLY
ELSE              COMPLETED'
     #   NEW SYSTEM INSTALLATION IMPROPER TERMINATION
         REPORTING TO HOST / LOGGING
     SEND/LOG   'ACCIDENT HAS OCCURRED IN NEW SYSTEM
                 INSTALLATION PROCESS'
FI
#   REPORTING TO HOST / LOGGING OF CUSTOMIZED DATA
    SETTING STARTING
SEND/LOG   'CUSTOMIZED DATA SETTNG IS STARTING'

CUSTOMIZED DATA SETTING   ###
IF    'RESCUSTMZ FROM-MOO TO-HDO' = = OK
THEN
     #   CUSTOMIZED DATA SETTING PROPER COMPLETION
         REPORTING TO HOST / LOGGING
     SEND/LOG   'CUSTOMIZED DATA SETTING HAS BEEN PROPERLY
ELSE              COMPLETED'
     #   CUSTOMIZED DATA SETTING IMPROPER TERMINATION
         REPORTING TO HOST / LOGGING
     SEND/LOG   'ACCIDENT HAS OCCURRED IN CUSTOMIZED DATA
FI               SETTING PROCESS'

#   USER DATA SETTING
#   REPORTING TO HOST / LOGGING OF USER DATA SETTING
    STARTING
SEND/LOG   'USER DATA SETTING IS STARTING'

USER DATA SETTING   ###
IF    'RESUSYS FROM-MOO TO-HDO' = = OK
THEN
     #   USER DATA SETTING PROPER COMPLETION
         REPORTING TO HOST / LOGGING
     SEND/LOG   'USER DATA SETTING HAS BEEN PROPERLY
                   COMPLETED'
ELSE
     #   USER DATA SETTING IMPROPER TERMINATION
         REPORTING TO HOST / LOGGING
     SEND/LOG   'ACCIDENT HAS OCCURRED IN USER DATA
                 SETTING PROCESS'
FI

#   IPL CONTROLLING SENTENCE DELETION
REMOVE HDO-SYSUP_IPL

#   RE-IPL ⇨ NEW SYSTEM OPERATION
REIPL
```

FIG.12

| | | AUTOMATAD INSTALLATION | | |

PLEASE SELECT INSTALLATION PATTERN FROM THE FOLLOWING GROUP DEFINITIONS.

■ AUTOMATING DEFINITIONS FOR VERSION−UP

☐ AUTOMATING DEFINITIONS FOR SYSTEM−REPLACEMENT

☐ CANCEL

OPERATING SYSTEM RENEWING APPARATUS AND METHOD FOR INSTALLING NEW OPERATING SYSTEM IN COMPUTER SYSTEM

This application is a continuation of application Ser. No. 08/278,817, filed Jul. 22, 1994, now abandoned.

BACKGROUND OF THE INVENTION

1. Field of the Invention

The present invention relates to an operating system renewing apparatus for installing a new operating system in a computer system.

2. Description of the Related Art

An example of an operation system renewing apparatus in the related art will now be described with reference to FIG.1. A step S2 (the term 'step' will be omitted, hereinafter) switches on the power of a computer system. S4 executes IPL (initial program loading) of an existing operating system. S6 transfers certain sorts of information from the thus loaded existing operating system to a recording medium such as a magnetic tape. The certain sorts of information include office automation (OA) data such as application programs and document files, environment data such as data regarding user resources and customized data such as program parameters set for particular uses, and network definition data regarding another environment such as a network. The certain sorts of data to be transferred are specified one-by one by an operator using relevant commands. Such data transfer is made for a purpose of saving the data. S8 checks whether the above data transfer has been completed. If S8 determines such data-transfer completion, S10 switches off the power of the computer system so as to delete the existing operating system from a memory of the computer system.

S12 loads, in the computer system, a recording medium such as a flexible magnetic disc, a magnetic tape or the like having an independent utility stored therein. The independent utility is a system similar to an operating system having an IPL program. S14 switches on the power of the computer system. In S16, the independent utility installs a new operating system as a result of reading the new operating system from a recording medium such as a magnetic tape. S18 checks whether the new operating system has been properly installed. If S18 determines such proper installation, S20 switches off the power of the computer system so as to delete the independent utility from the memory of the computer system.

S22 switches on the power of the computer system. S24 performs IPL of the new operating system. S26 transfers the above certain sorts of information, previously saved in the recording medium in S6, from the recording medium to the computer system. The operator specifies one-by-one the above certain sorts of information to be transferred using relevant commands. S28 checks whether the transferring of the certain sorts of information has been completed. If S28 determines such data transfer completion, S30 switches off the power of the computer system. S32 switches on the power of the computer system. The new operation system can be practically used in S33.

The operator reports, via telephone or the like, the above completion of the new operating system installation to an operator of a higher-rank managing computer system which manages the above computer system having the above new operating system installed as described above. However, if there are many similar computer systems having similar renewing/installation work performed thereon, it is difficult to appropriately manage execution of the renewing/installation work in all the computer systems in real-time.

In the operation flow shown in FIG. 1, the existing operating system operates between S2 and S10, the independent utility operates between S12 and S20 and the new operating system operates between S22 and S33.

Such an operating system renewing apparatus in the related art requires many processes such as installation of a new operating system, transferring of certain sorts of information and so forth as described above. Further, such an apparatus in the related art requires a special operator who can perform complicated operations such as setting recording media, inputting relevant commands and so forth as described above. Thus, if a user wishes to improve an existing operating system by renewing it with a new operating system, the user has to request that such a special operator come to the relevant site. As a result, such renewal work is costly and requires a large amount of work time. Further, if the user wishes to know how the work is progressing or if a problem has occurred during the work, the special operator has to report such matters to the user via a telephone of the like. Thus, a real-time management of the work is difficult.

SUMMARY OF THE INVENTION

An object of the present invention is to provide an operating system renewing apparatus and method for enabling an operating system renewing work to be easily performed by a user and enabling centralized management of such renewing work performed on a plurality of computer systems.

In order to achieve the above object, an operating system renewing apparatus according to the present invention is provided, the apparatus comprising:

new system installing means for installing a new operating system in system storing means; and a saving area for saving therein common information.

Further, an operating system renewing method according to the present invention is provided, the method comprising steps of:

a) installing a new operating system in system storing means; and b) saving existing common information.

Other objects and further features of the present invention will become more apparent from the following detailed description when read in conjunction with the accompanying drawings.

BRIEF DESCRIPTION OF THE DRAWINGS

FIG. 6 shows network definition saving controlling sentences used in the computer system shown in FIG. 3;

FIG. 7 shows IPL definition controlling sentences used in the computer system shown in FIG. 3;

FIG. 8 shows network definition activation controlling sentences used in the computer system shown in FIG. 3;

FIGS. 9 and 10 show installation controlling sentences used in the computer system shown in FIG. 3;

FIG. 12 shows contents displayed on a display screen in the computer system shown in FIG. 3.

DESCRIPTION OF THE PREFERRED EMBODIMENTS

Figure 1:
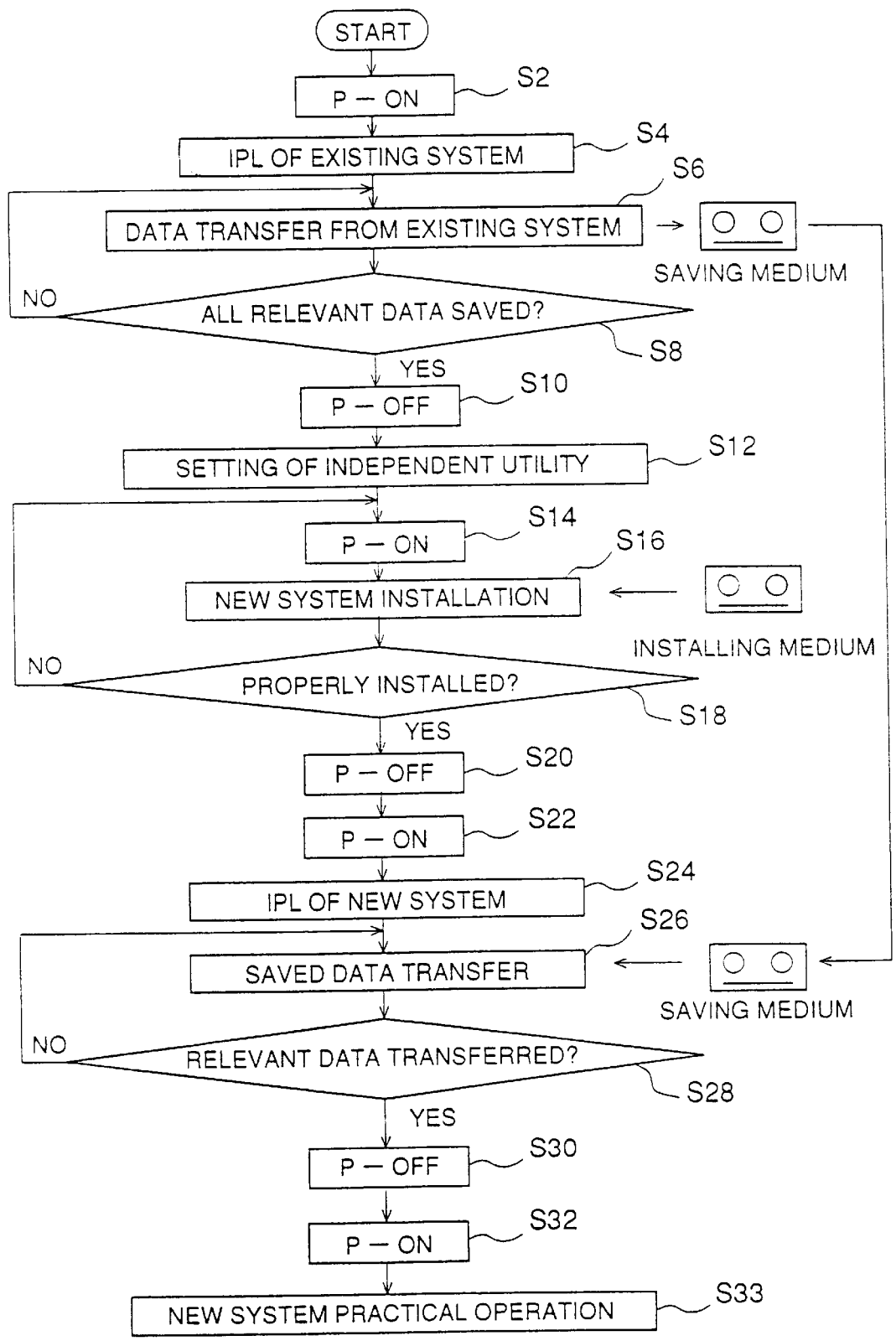
FIG. 1 shows an operating flow of an operating system renewing apparatus in the related art.
Figure 2:
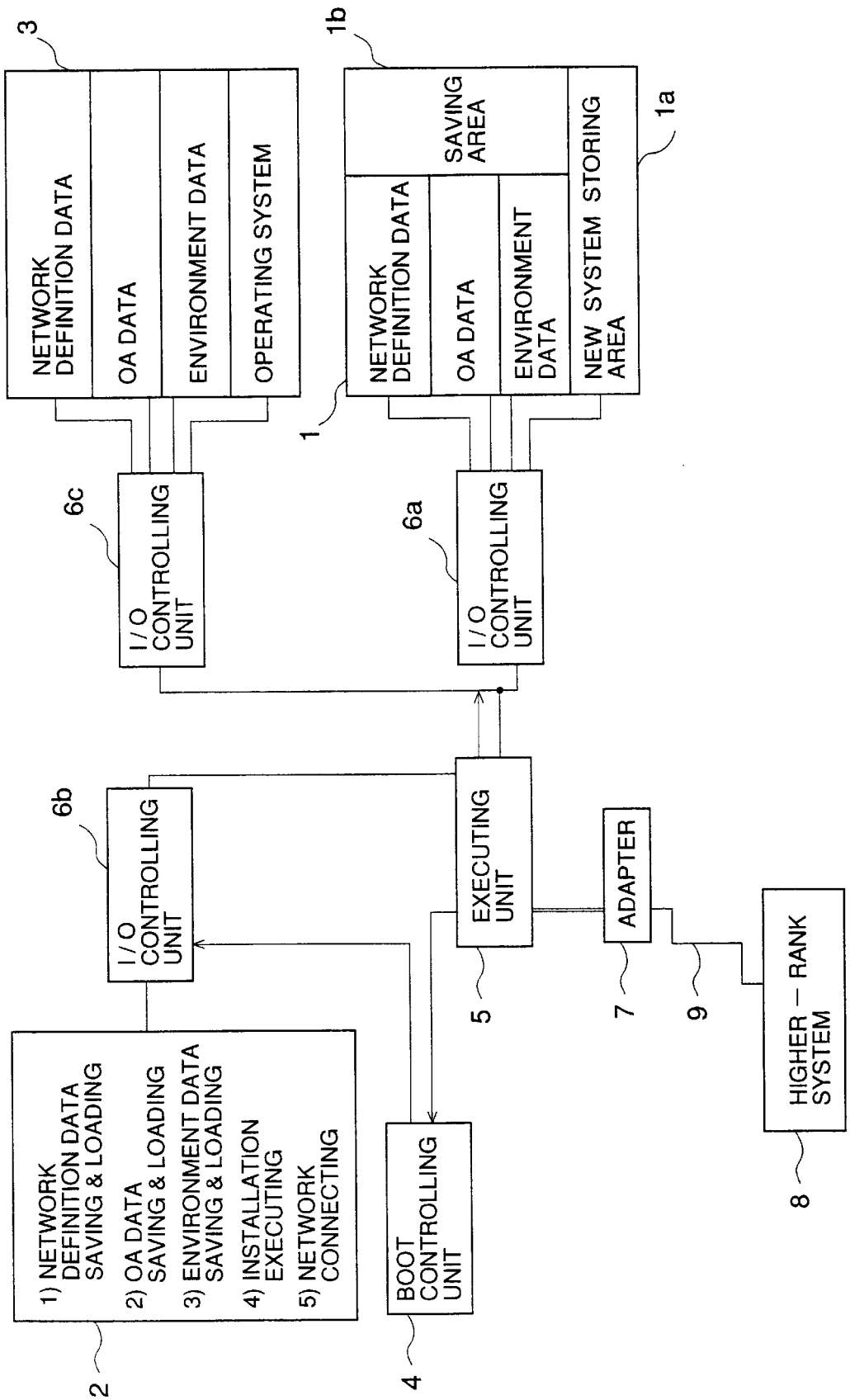
FIG. 2 shows a block diagram of an operating system renewing apparatus in a first embodiment of the present invention and also shows a principle of a computer system in a second embodiment of an operating system renewing apparatus according to the present invention.

With reference to FIG. 2, an operating system renewing apparatus in a first embodiment of the present invention will now be described. New system supplying means 1 includes a new system storing area 1a for storing a new operating system and a saving area 1b for storing common information, included in an existing operating system, to be saved. Such common information is information provided for an operating system so that the operating system is made suitable for relevant practical uses. Thus, the common information included in an existing operating system should also be included in the new operating system. The common information includes network definition data, OA data, environment data and data such as those described above.

Installing process storing means 2 previously stores a plurality of processes 1), 2), 3), 4) and 5) as shown in the figure. The process 1) saves and loads the network definition data, the process 2) saves and loads the OA data, the process 3) saves and loads the environment data, the process 4) executes installation of a new operating system, and the process 5) connects the operating system renewing apparatus with another system. The processes are executed so as to appropriately renew the existing operating system stored in system storing means 3 with the new operating system stored in the new system storing area 1a.

A boot controlling unit 4 reads the processes 1) through 5) from the installing process storing means 2.

An executing unit 5 causes the thus read processes to be executed.

The above new system supplying means 1, installing process storing means 2, and system storing means 3 have I/O controlling units 6a, 6b and 6c, respectively, as shown in the figure.

The above boot controlling unit 4 reads a process of the processes 1) through 5) and then supplies the thus read process to the above executing unit 5 to execute the process. After the executing unit 5 has executed the process, the executing unit 5 causes the boot controlling unit 4 to read the process of the processes 1) through 5) subsequent to the one just executed.

The above processes 1), 2) and 3) save, in the saving area 1b, the common information included in the existing operating system stored in the system storing means 3. The saving operation is executed before the process 4) installs the new operating system in the system storing means 3. After the installation of the new operating system has been completed, the above processes 1), 2) and 3) transfer the common information from the saving area 1b to the system storing means 3.

An adapter 7 connects the operating system renewing apparatus with a higher-rank (managing) system 8 via a communication line 9.

In the above process 5) an adapter 7 connects the operating system renewing apparatus with the higher-rank system 8 via a communication line 9 so that information as to how the new operating system renewing work has been executed/has been made to proceed in the operating system renewing apparatus is reported to the higher-rank system 8 therethrough.

In the above operating system renewing apparatus, the new operating system stored in the new system supplying means 1 is automatically installed in the system storing means 3 through the proper steps. Execution of such proper steps of the system installation work is ensured as a result of the processes 1) through 5) being appropriately read and executed. Thus, no special operator is required for the installation work and a user may easily perform the work through the apparatus. Further, storing the common information, including the network definition data, OA data and environment data, in the saving area 1b prevents the data from being accidentally lost during the work.

Further, the process 5) connects the apparatus with the higher-rank system 8 via the adapter 7 and reports the installation work progress condition to the system 8 as described above. Thus, if there are many similar computer systems having similar renewing/installation work performed thereon, centralized management of the renewing/installation work executed in all the computer systems can be made in real-time through the higher-rank system 8.

Figure 3:
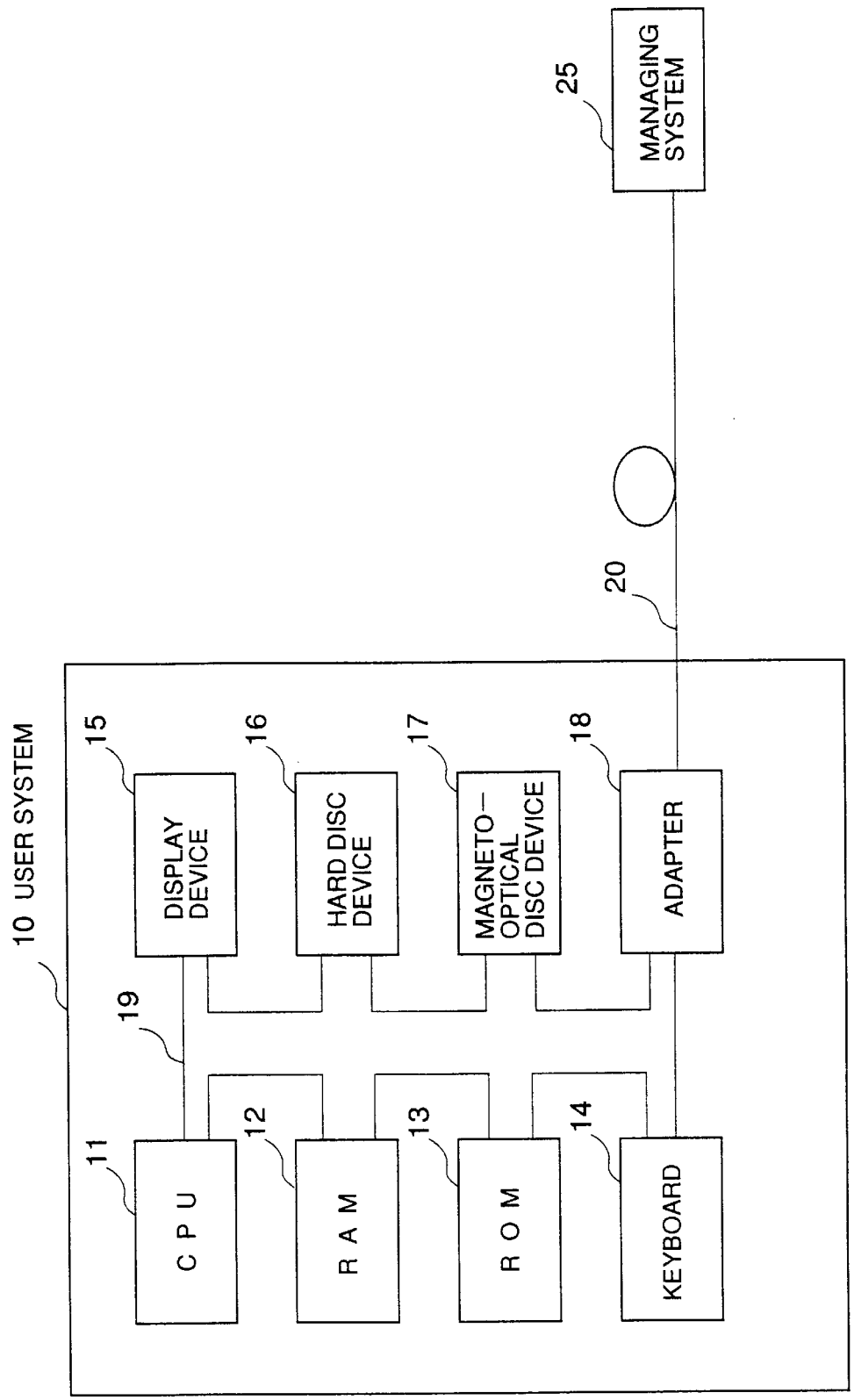
FIG. 3 shows a block diagram of the above computer system in the second embodiment.

With reference to FIG. 3, a computer system in a second embodiment of an operating system renewing apparatus according to the present invention will now be described. A user system 10 includes a central processing unit (CPU) 11, a RAM 12 and a ROM 13, both acting as internal storage devices, a keyboard 14 acting as an inputting device, a display device 15 such as a CRT, a hard disc device 16 and a magneto-optical disc device 17, both acting as external storage devices, and an adapter 18 connected with a network 20. All the above devices are connected with one another via a bus 19. An operating system, such as, for example, a known UNIX (a multiuser, multitasking operating system) is stored in the above hard disc device 16. A managing system 25 is connected with the network 20. The hard disc device 16 acts as the system storing means 3 shown in FIG. 2 and an magneto-optical information storage medium (referred to as MO medium, hereinafter) 30 (see FIG. 4) of the magneto-optical disc device 17 acts as the new system supplying means 1, installing process storing means 2, and boot controlling unit 4 shown in the figure. The CPU 11 acts as the executing unit 5 and the managing system 25 acts as the higher-rank system 8.

A format of the MO medium 30 acting as an installing medium will now be described with reference to FIG. 4. The MO medium 30 includes an independent utility area 31, an automating definition area 32, a new (operating) system area 33 and a saving area 34, as shown in the figure. An IPL program and an automating routine are previously stored in the independent utility area 31. Processes to be executed by the above automating routine are previously stored as forms of the relevant definitions in the automating definition area 32. A new operating system such as, for example, another UNIX is previously stored in the new operating system area 33. The saving area 34 is used to save therein common information such as that described above. The capacity of the above independent utility area 31 and automating definition area 32 is in an order of 10 kilobytes, for example. The capacity of the new operating system area 33 is in an order of 40 kilobytes, for example, and the capacity of the saving area 34 is in an order of 80 kilobytes, for example.

Automating definitions stored in the automating definition area 32 will now be described. The automating definitions include group definition controlling sentences, IPL definition controlling sentences, installation controlling sentences, and network definition controlling sentences.

The group definition controlling sentences are controlling sentences for defining each of editing units of the automating definitions as containing a group of definitions. The IPL definition controlling sentences are controlling sentences describing processing logic used in IPL of the independent utility. The IPL definition controlling sentences are automatically produced when an automated installation operation is started and are automatically deleted after the automated installation operation has been completed.

The installation controlling sentences are controlling sentences describing processing logic for saving the OA data and/or environment data contained in the existing system and for setting the thus saved data in the new operating system after the new operating system has been installed. The network definition controlling sentences are controlling sentences describing processing logic for saving the network definition data contained in the existing operating system and for activating the thus saved data in the new operating system.

Further, there is a case where execution history definition controlling sentences are is included in the automating definitions, the sentences describing processing logic for logging the history of automated installation results (as to whether or not the automated installation has been properly completed).

Figures 4, 5A, 5B:
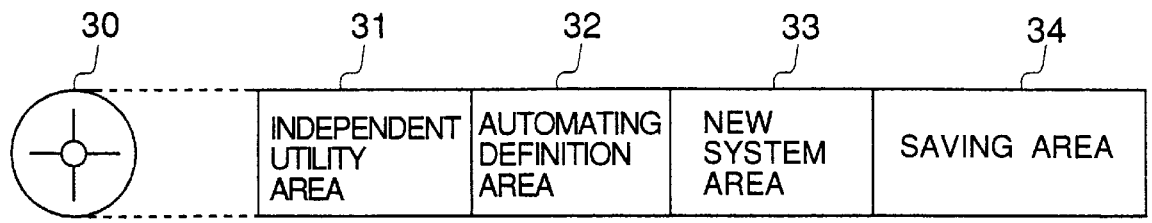
FIG. 4 illustrates a format of a magneto-optical information storage (MO) medium used in the computer system shown in FIG. 3.
FIGS. 5A and 5B show group definition controlling sentences (the term 'sentence' used in the specification and drawings refers to a statement to be read by a computer) used in the computer system shown in FIG. 3.

With reference to FIGS. 5A and 5B, examples of the group definition controlling sentences will now be described. The example shown in FIG. 5A defines automating definitions for version upping and for system replacement SYSUP, SYSCHG. The example shown in FIG. 5B indicates a group definition starting procedure for starting a process of network definition saving controlling sentences SYSUP_SAVNET.

The above sentences SYSUP_SAVNET, shown in FIG. 5, describe processes to save, in the saving are 34, the network definition data previously stored in the hard disc device 16 to save this data, to log the result of the saving operation (as to whether or not it has been properly completed), to produce the IPU controlling sentences SYSUP_IPL, and to execute the thus produced IPL controlling sentences. In FIG. 6, the symbol # indicates starting of comments and the symbol : indicates ending of the comments, the symbols ' ' after the word IF indicate that the contents bracketed by the symbols are data to be determined, the same symbols ' ' after the word LOG indicate that the contents bracketed by the symbols are a logging message in a logging sentence, and the word FI indicates ending of determining sentences starting with the word IF.

The IPL definition sentences SYSUP_IPL shown in FIG. 7 describe a process to start the network definition activation controlling sentences SYSUP_ACTNET. The network definition activation controlling sentences SYSUP_ACTNET for starting the installation controlling sentences SYSUP_INSTALL shown in FIG. 8 activate, in the independent utility in the independent utility area 31, the network definition data previously saved in the saving area 34 of the MO medium 30. The above network definition activation controlling sentences then log the result of the activating process (as to whether or not it has been properly completed).

The installation controlling sentences SYSUP_INSTALL shown in FIGS. 9 and 10 transmit to the managing system 25 a message for indicating the user data saving to be executed and log it, as shown in FIG. 9. The above installation controlling sentences save in the saving area 34 the user data (OA data) and then transmit the result of the saving process (as to whether or not it has been properly completed) to the managing system 25 and log it. Then, the installation controlling sentences transmit to the managing system 25 a message indicating the customized data saving to be executed and log it. The installation controlling sentences save the customized data (environment data) in the saving area 34, then transmit to the managing system the result of the saving process (as to whether or not it has been properly completed) and log it. Then, as shown in FIG. 10, the installation controlling sentences transmit to the managing system 25 a message indicating a new system installation to be executed and log it. The installation controlling sentences install in the hard disc device 16 the new operating system stored in the new system area 33 of the MO medium 30, then transmit to the managing system 25 the result of the installation process (as to whether or not it has been properly completed) and log it. Then, the installation controlling sentences transmit to the managing system 25 a message indicating a customized data setting to be executed and log it. The installation controlling sentences transfer the environment data previously saved in the saving area 34 of the MO medium 30 to the hard disc device 16, thus setting the customized data in the new operating system, and then transmit to the managing system 25 the result of the customized setting process (as to whether or not it has been properly completed) and log it. Then, the installation controlling sentences transmit to the managing system 25 a message indicating user data setting to be executed and log it. The installation controlling sentences transfer the OA data previously saved in the saving area 34 of the MO medium 30 to the hard disc device 16, thus setting the user data in the new operating system, and then transmit to the managing system 25 the result of the user data setting process (as to whether or not it has been properly completed) and log it.

Then, the installation controlling sentences deletes the IPL controlling sentences shown in FIG. 7 previously stored in the hard disc device 16 and executes IPL of the new operating system previously stored in the hard disc device 16.

Figure 11:
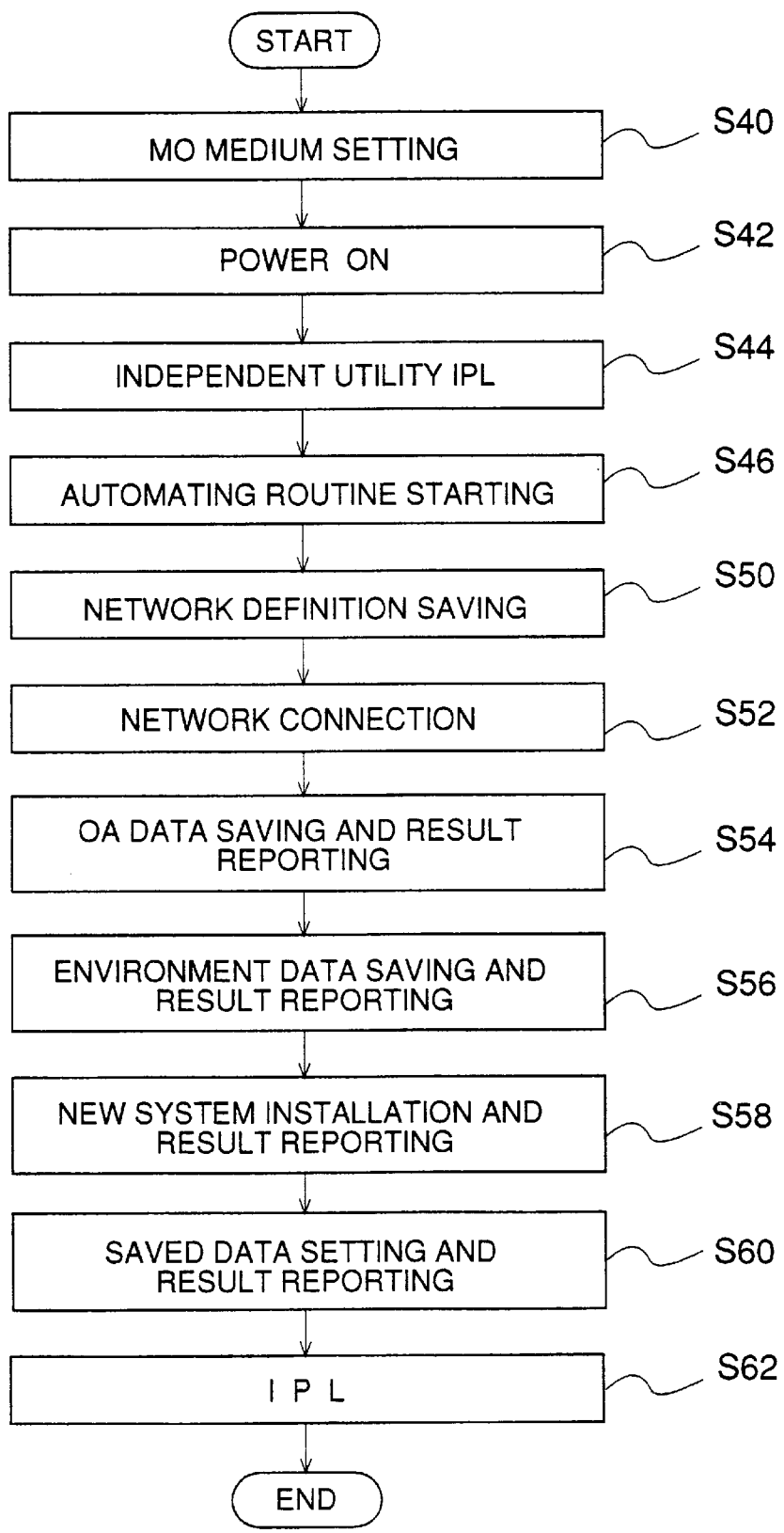
FIG. 11 shows an operating flow of the computer system shown in FIG. 3.

With reference to FIG. 11, an operating flow of the processes executed according to the automating definitions shown in FIGS. 5A, 5B, 6, 7, 8, 9 and 10 will now be described. S40 loads the MO medium 30 on the magneto-optical disc device 17. S42 switches on the power of the user system 10. Thus, S44 loads the independent utility in the user system 10 through the IPL program stored in the independent utility area 31. S46 starts the automating routine included in the thus loaded independent utility. Thus, an expression such that shown in FIG. 12 is displayed on the display device 15.

As the automating routine reads the automating definitions from the area 32 of the MO medium 30, S50 executes the processes described by the network definition saving controlling sentences SYSUP_SAVNET so that the network definition data contained in the existing operating system is saved in the saving area 34 of the MO medium 30 and the IPL controlling sentences are produced. S52 executes the processes described by the network activation controlling sentences SYSUP_ACTNET so that the network definition data previously saved in the saving area 34 of the MO medium 30 is activated in the independent utility and the user system 10 is connected with the network 20.

As the installation controlling sentences are executed, S54 saves, in the saving area 34 of the MO medium 30, all the OA data used by a user, then reports to the managing system 25 via the network 20 as to whether the above saving process has been properly completed. S56 saves in the saving area 34 of the MO medium 30 the environment data such as the customized data contained in the existing operating system, then reports to the managing system 25 via the network 20 as to whether the above saving process has been properly completed.

S58 installs the new operating system in the hard disc device 16 of the system 10, the new operating system having been previously stored in the new operating system area 33 of the MO medium 30, then reports to the managing system 25 via the network 20 as to whether the above installation process has been properly completed. S60 loads the OA data and the environment data on the hard disc device 16 of the system 10, the OA data and the environment data having been previously saved in the saving area 34 of the MO medium 30. Thus, the OA data and the environment data are set in the new operating system previously installed in the hard disc device 16, then whether or not the loading/setting of the saved data has been properly completed is reported to the managing system 25 via the network 20.

S62 deletes the IPL controlling sentences from the hard disc device 16 and performs IPL of the new operating system. Since the IPL of the new operating system is a starting-up/resetting operation performed through software, the relevant memory and so forth are initialized as they are when the power has been switched on, installation of the new system thus being completed. Thus, the new operating system can then be used for practical uses.

Thus, in the user system 10 in the second embodiment of an operating system renewing apparatus according to the present invention, the operator's loading of the MO medium 30 in the magneto-optical disc device 17 is sufficient to load in the system 10 the independent utility stored in the MO medium 30, the independent utility then automatically performing saving of the common data, installation of the new operating system, and setting of the saved common data on the new operating system. Such new operating system renewing work requires no special operator. Instead, a user is required to preform only a simple operation such as loading of the MO medium as described above, thus reducing cost and work time required for performing the work.

Further, the independent utility reports how the operating system renewing/installation operation is proceeding/when this operation has been executed, to the managing system 25 via the network 20, the reporting being performed based on the network definitions previously saved in the MO medium. Thus, even if similar operating system renewing/installation work is performed on a plurality of user systems such as the system 10 in parallel, it is possible through the managing system 25 to achieve real-time centralized management of all the renewing/installation works. Thus, the operating system renewing apparatus and method according to the present invention are very useful from a practical point of view.

Further, the present invention is not limited to the above described embodiments, and variations and modifications may be made without departing from the scope of the present invention.

What is claimed is:

1. An operating system renewing apparatus comprising:
    saving means for saving, only when instructions are given to install a new system, a network and system environment definition file which was set on an existing system; and
    installing means for installing said new system over said existing system, restoring the saved definition file, and setting network and system environment according to the restored definition file.

2. An operation system renewing apparatus comprising:
    saving means for saving, only when instructions are given to install a new system, a data file which was produced on an existing system; and
    installing means for installing said new system over said existing system, and restoring the saved data file.

* * * * *